United States Patent [19]

Maruoka

[11] Patent Number: 5,893,478

[45] Date of Patent: Apr. 13, 1999

[54] CONTAINER FOR SMALL ARTICLES WITH HIDDEN COVER LOCKING DEVICE

[75] Inventor: Hiroyuki Maruoka, Tokyo, Japan

[73] Assignee: Nifco Inc., Yokohama, Japan

[21] Appl. No.: 08/651,672

[22] Filed: May 21, 1996

[30] Foreign Application Priority Data

Jul. 4, 1995 [JP] Japan ................ 7-199765

[51] Int. Cl.[6] ............................................. B65D 43/14
[52] U.S. Cl. ............... 220/335; 220/264; 220/324; 220/326; 220/669; 220/675; 296/37.8; 16/354
[58] Field of Search ................... 16/354; 224/542; 296/37.14, 37.8; 220/335, 334, 326, 324, 323, 264, 670, 671, 669, 675, 676; 295/DIG. 17; 312/326–329, 7.2, 7.1

[56] References Cited

U.S. PATENT DOCUMENTS

| 1,906,428 | 9/1933 | Fralick | 220/283 |
|---|---|---|---|
| 2,307,087 | 1/1943 | White | 220/283 |
| 3,651,983 | 3/1972 | Haugen | 220/339 X |
| 4,093,103 | 6/1978 | Mumford | 220/283 |
| 4,245,685 | 1/1981 | Nemitz et al. | 220/675 X |
| 4,799,604 | 1/1989 | Okojima et al. | 220/326 X |
| 5,050,922 | 9/1991 | Falcoff | 296/37.8 X |
| 5,065,884 | 11/1991 | Naritomi et al. | 220/334 X |
| 5,067,625 | 11/1991 | Numata | 220/335 X |
| 5,090,851 | 2/1992 | Kobayashi | 292/71 |
| 5,183,180 | 2/1993 | Hawkins et al. | 220/675 X |
| 5,280,848 | 1/1994 | Moore | 220/264 X |
| 5,292,158 | 3/1994 | Kurosaki | 292/45 |
| 5,403,058 | 4/1995 | Fischer | 296/37.7 |
| 5,465,862 | 11/1995 | Devlin | 220/335 |
| 5,603,540 | 2/1997 | Shibao | 292/DIG. 17 X |
| 5,620,122 | 4/1997 | Tanaka | 220/264 X |
| 5,639,002 | 6/1997 | Weitbrecht et al. | 220/335 X |
| 5,713,623 | 2/1998 | Mattingly | 296/37.8 X |

*Primary Examiner*—Stephen K. Cronin
*Assistant Examiner*—Robin Hylton
*Attorney, Agent, or Firm*—Kanesaka & Takeuchi

[57] ABSTRACT

A container for small articles is formed of a housing having a an opening at an upper face thereof, a cover movably attached to the housing, and a locking device. The cover moves between a closing position for closing the opening, and an opening position for opening the opening of the housing. The cover is located at one side of the housing in the opening position. The locking device includes a catcher having a latching portion therein and attached to the cover, and a striker attached to housing. When the cover is disposed to the closing position, the striker engages the latching portion to lock the cover at the closing position, and when the cover in the closing position is pushed, the striker engaged with the latching portion is released from the latching portion, so that the cover is moved to the opening position.

5 Claims, 8 Drawing Sheets

CONTAINER FOR SMALL ARTICLES WITH HIDDEN COVER LOCKING DEVICE

BACKGROUND OF THE INVENTION AND RELATED ART STATEMENT

The present invention relates to a container for small articles to be provided in or attached to, for example, a console box of a vehicle.

Recently, in order to effectively use spaces in a vehicle, a box for containing small articles has been installed in an instrument panel or a central console. Also, there is a box, which can be used as a cup holder disclosed, for example, in Japanese Utility Model Publication (KOKAI) No. 5-65687.

FIG. 11 is a perspective view for showing a container for small articles with a cup holder for a vehicle, disclosed in Japanese Utility Model Publication (KOKAI) No. 5-65687. The container comprises a box-shape housing 51 with an opening at an upper face for containing small articles therein; a cover 53 for covering the upper face of the housing 51 and rotatably provided on the housing 51 through a hinge 52; a spring member, not shown, for urging the cover 53 toward an opening position thereof; and a locking device including a catcher 54 provided on the housing 51 and a striker 55 provided on the cover 53.

Normally, the striker 55 is releasably latch-locked by the catcher 54 so that the cover 53 is locked at a closing position against a spring force of the spring member, and when the latch-locking is released, the cover 53 is moved to the opening position by the spring force of the spring member to thereby open the opening. In the structure, when the cover 53 is opened, an opening 56 at a latch portion of the catcher 54 for receiving the striker 55 faces upwardly.

As described above, in the conventional container for the small articles of the vehicle with the cup holder, the locking device for closing and locking the cover 53 includes the catcher 54 provided on the housing 51 and the striker 55 provided on the cover 53. In a state where the cover 53 is opened, the opening 56 at the latch portion of the catcher 54 for receiving the striker 55 faces upwardly and is opened. Therefore, when a beverage in a container received in the housing 51 is spilled, the spilled beverage enters the catcher 54, and also, dust enters the catcher 54 through the opening 56. The spilled beverage and dust adhere to the locking device or the like, so that a locking or unlocking operation may not be carried out.

The present invention has been made to obviate the above problems, and one object of the invention is to provide a container for small articles in a vehicle, which can substantially reduce accidents or troubles in a locking mechanism.

Another object of the invention is to provide a container for small articles in the vehicle as stated above, wherein the container has a good and simple shape when the cover is opened.

A further object of the invention is to provide a container for small articles in the vehicle as stated above, which can be easily and economically manufactured.

Further objects and advantages of the invention will be apparent from the following description of the invention.

SUMMARY OF THE INVENTION

In order to attain the above objects, the present invention comprises a box-shape housing having an upper opening for receiving small articles therethrough; a cover movable between a closing position for closing the upper opening of the housing and an opening position for opening the upper opening by rotating toward a side face of the housing; a spring device for urging the cover toward the opening position; and a locking device including a catcher having a latch portion and a striker to be latch-locked to the latch portion. When the cover is positioned to the closing position, the striker is latch-locked to the latch portion to lock the cover at the closing position, and when the cover is pushed from the closing position, the latch-locking of the striker with the latch portion is released, so that the cover is allowed to move to the opening position. The striker is provided on the housing, and the catcher is provided on the cover.

According to the above structure of the invention, as the cover is opened and moved toward a side face of the housing, the catcher having the latch portion for receiving the striker is moved to a direction away from the upper opening to thereby protect the latch portion. Therefore, even if a beverage in a container received in the housing is spilled, the spilled beverage does not enter the latch portion. Also, dust does not enter the latch portion. Accordingly, operational defects in the latch portion caused by the spilled beverage and dust can be substantially eliminated. Also, when the cover is opened, the latch portion can be located to a place which is not seen in a compartment of the vehicle.

DETAILED DESCRIPTION OF A PREFERRED EMBODIMENT

Hereunder, an embodiment of the present invention is explained in detail with reference to the drawings.

Figure 1:
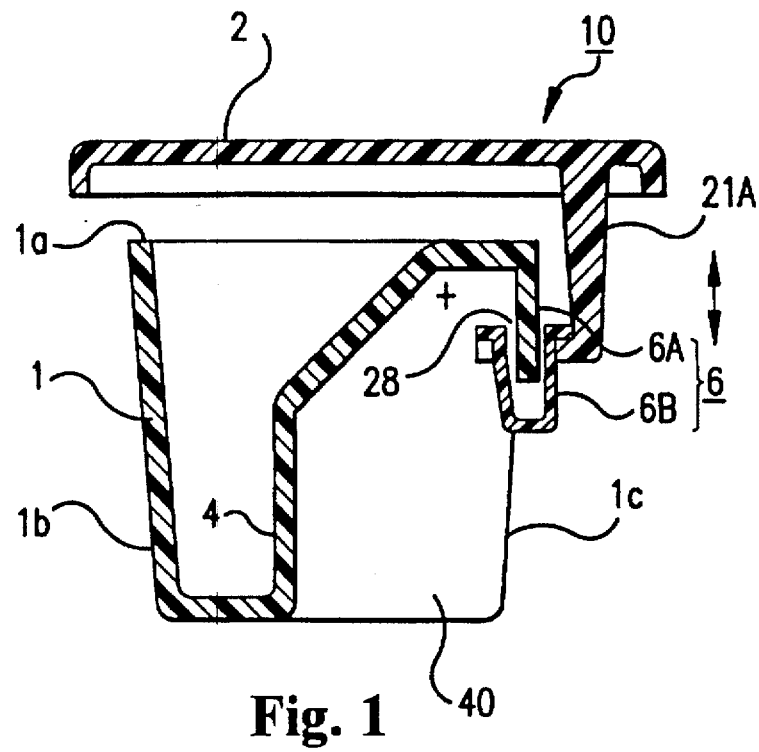
FIG. 1 is an explanatory view of an operation of a container for small articles of an embodiment according to the invention, wherein a cover is closed.
Figure 2:
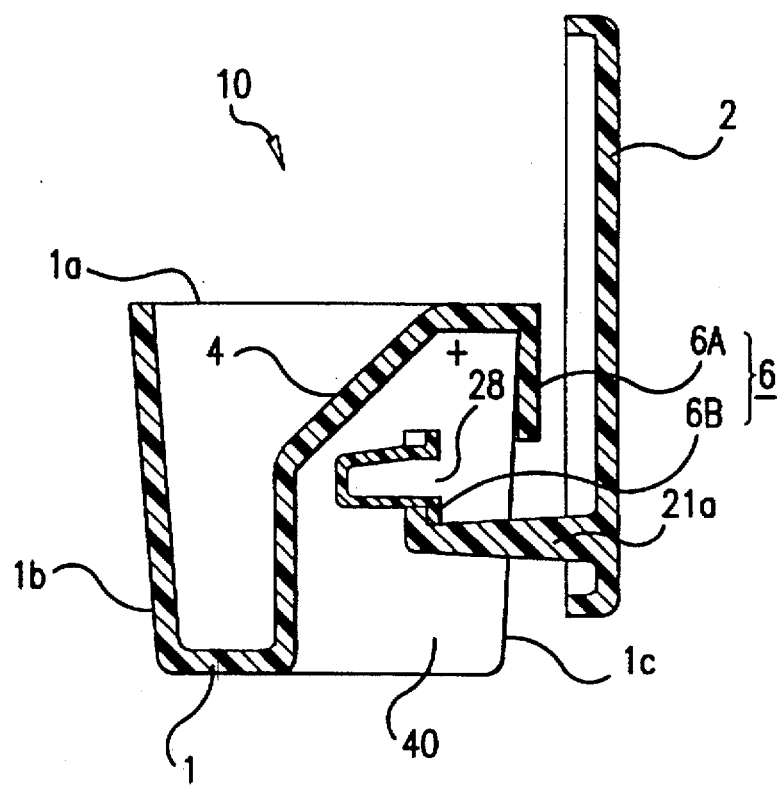
FIG. 2 is an explanatory view of an operation of the container of the invention, wherein the cover is opened.
Figure 3:
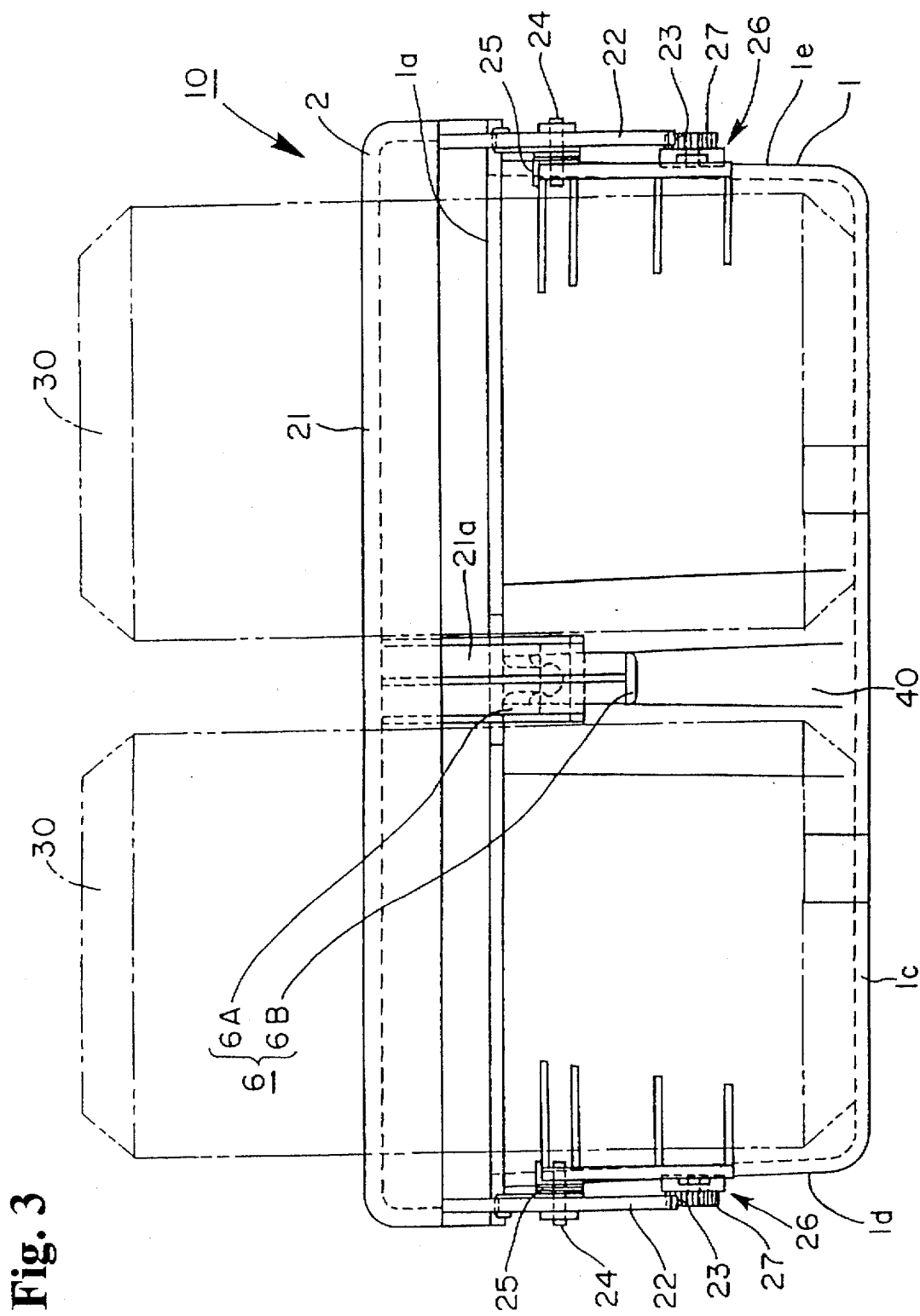
FIG. 3 is a rear view of the container of the invention.
Figure 4:
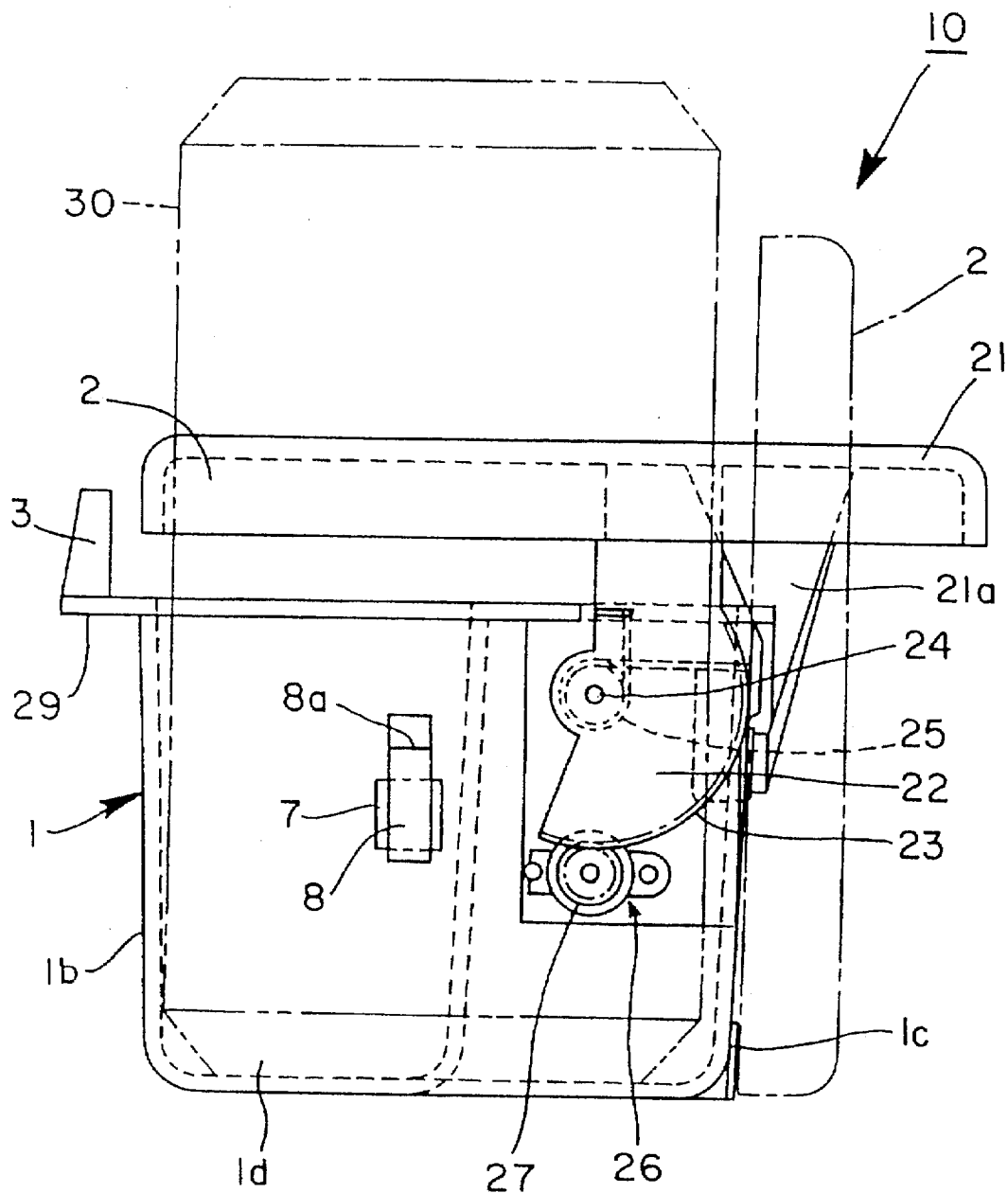
FIG. 4 is a side view of the container of the invention.
Figure 5:
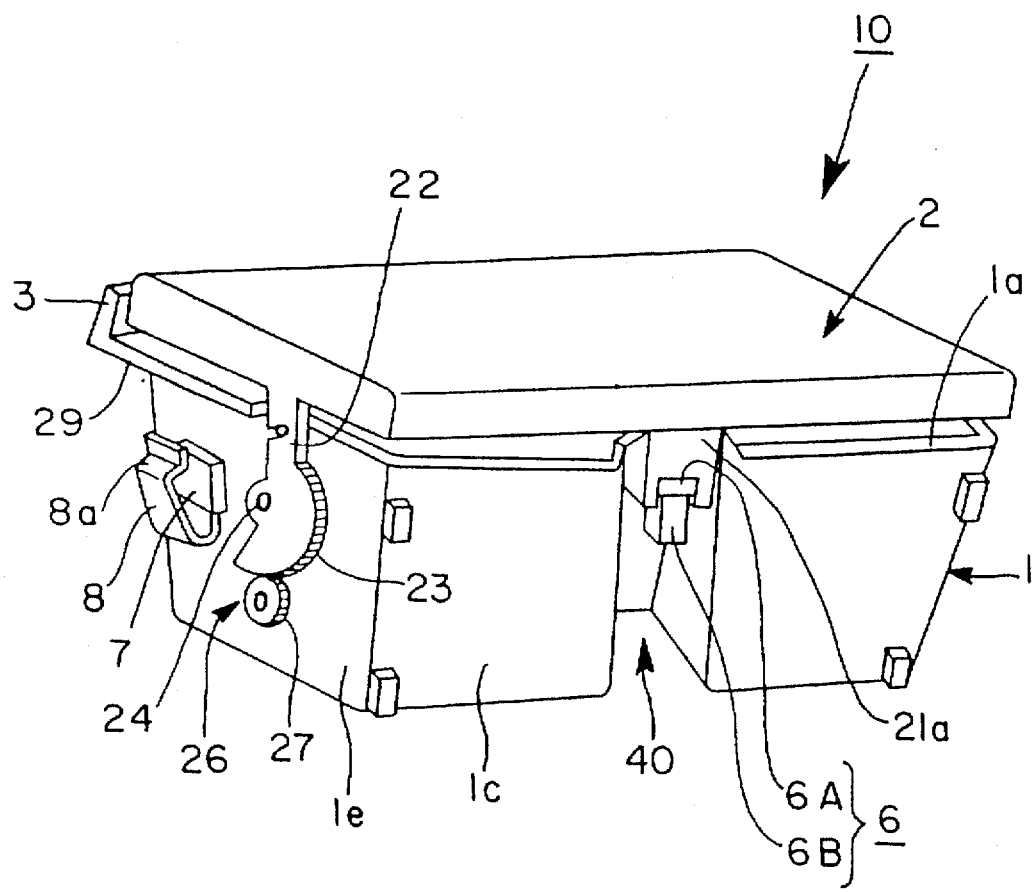
FIG. 5 is a perspective view of the container of the invention showing from a back side, wherein the cover is closed.
Figure 6:
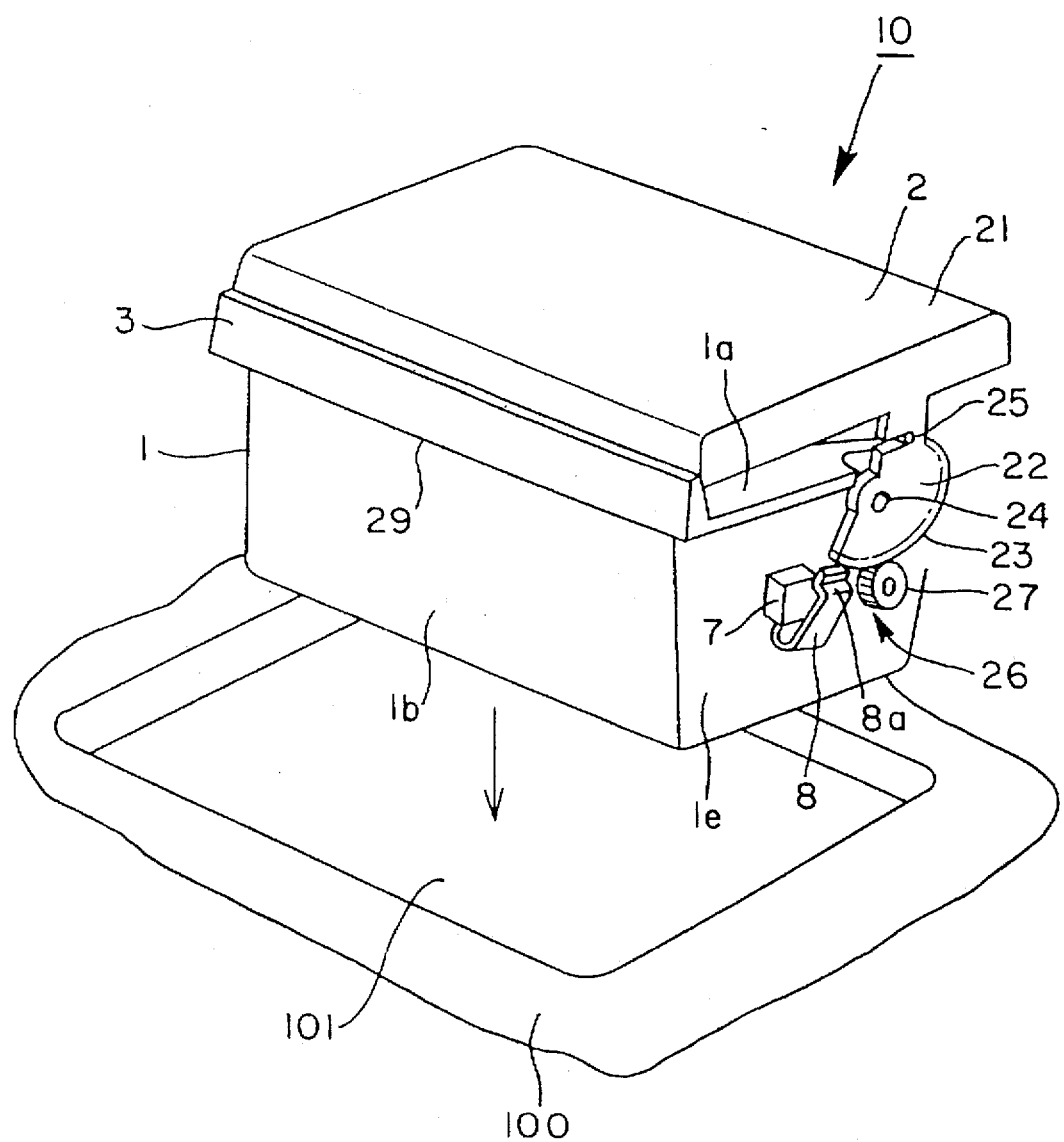
FIG. 6 is a perspective view of the container of the invention showing from a front side, wherein the cover is closed.
Figure 7:
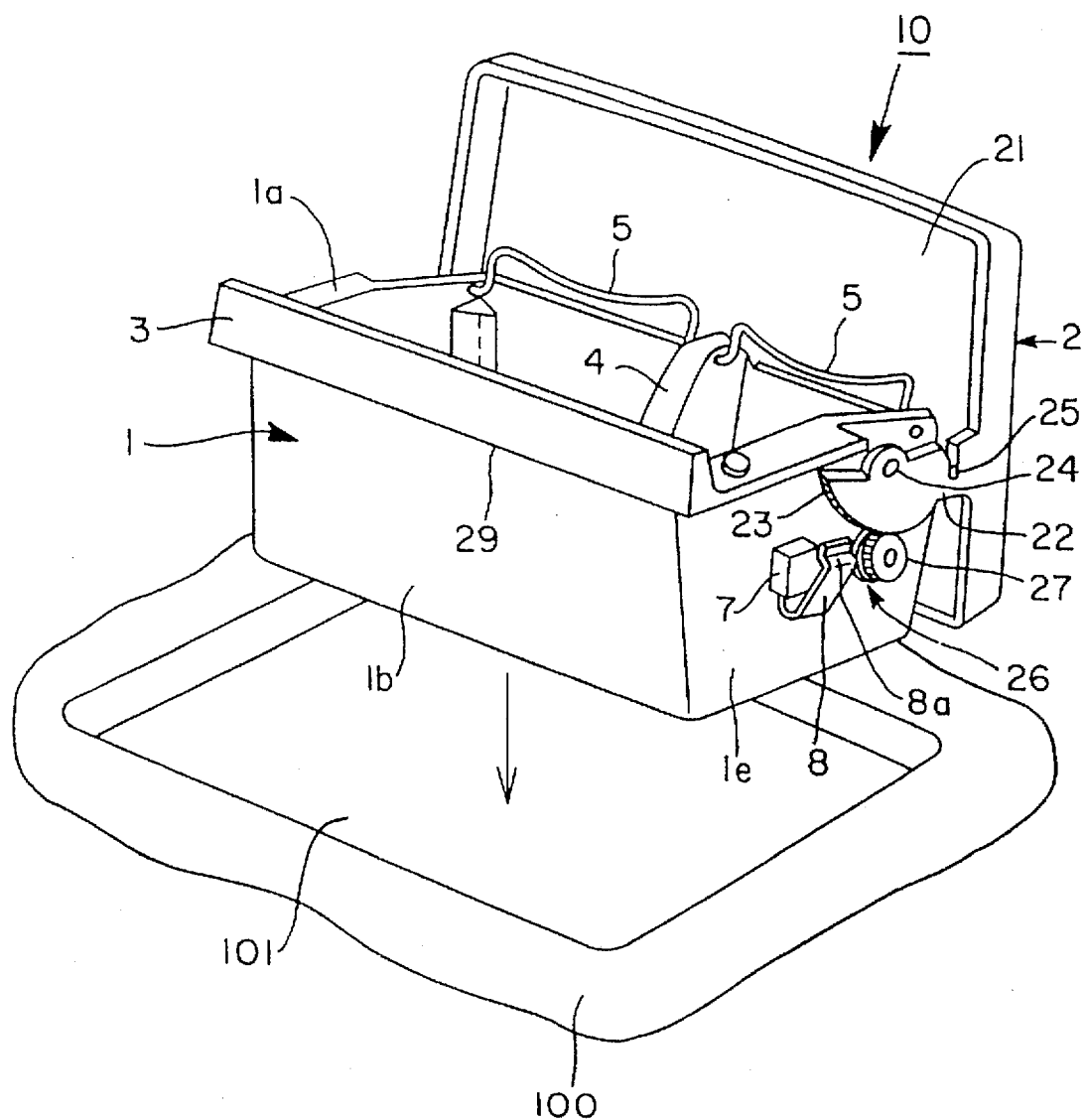
FIG. 7 is a perspective view of the container of the invention showing from the front side, wherein the cover is opened.

FIGS. 3 to 7 show an embodiment of a container for small articles in a vehicle of the present invention, wherein FIG. 3 is a rear view; FIG. 4 is a side view; FIG. 5 is a perspective view of the container viewed from a back side, wherein a cover is closed; FIG. 6 is a perspective view of the container viewed from a front side, wherein the cover is closed; and FIG. 7 is a perspective view of the container viewed from a front side, wherein the cover is opened. FIGS. 6 and 7 show a state in the middle of installation of the container to a central console box, respectively. Also, FIGS. 1 and 2 are sectional views for showing operational states of the container shown in FIGS. 3 to 7.

In FIGS. 1 to 7, a container 10 is used for holding small articles in a vehicle, and is also used as a cup holder. The container is basically formed of a box-shape housing 1, an upper face 1a which is opened for containing small articles therein, and a cover 2 for opening and closing the upper face 1a of the housing 1.

More specifically, the housing 1 is made of a resin, and at a portion where the upper face 1a contacts a front face 1b, a protecting wall 3 extending upwardly is integrally formed with the front face 1b. At an approximately middle portion of a back face 1c in a lateral direction of the housing 1, a portion 4 projecting toward an interior of the housing 1 is provided to divide the interior of the housing 1 into two areas for holding two cups. Incidentally, the projecting portion 4 assumes a dent 40 (refer to FIGS. 1, 2, 3 and 5) at an outside of the housing 1.

In addition, holding members 5 for the respective cup holders are provided in the housing 1. In a state where the cover 2 is opened, the holding members 5 are rotatably shifted between a "using position", wherein the holding members function as cup holders by extending horizontally in the opening portion of the housing 1, and a "non-using position" (refer to FIG. 7), wherein the holding members do not function as cup holders by falling into the inside of the cover 2 to extend in an approximately vertical direction.

When the container is used as the cup holders, in case the holding members 5 are disposed in the "using position", beverage containers 30 are prevented from moving in a horizontal direction in the housing 1, and when the holding members 5 are disposed in the "non-using position", the opening portion is made wide and can be used for other purposes.

Also, on a back face 1c of the housing 1, a striker 6A for constituting a lock device 6, which is described later, projects downwardly and is disposed in the dent 40.

Further, on the left and right faces 1d, 1e of the housing 1, spring attaching portions 7 are formed, and each spring attaching portion 7 is provided with a leaf spring 8. The leaf spring 8 is fixed to the spring attaching portion 7 at one end thereof. The other end of the leaf spring 8 gradually extends outwardly while rising upwardly, and a forward end portion of the other end is bent inwardly to thereby form an engaging pawl 8a.

The cover 2 is made of a resin, and is integrally formed of a main portion 21 for covering substantially the whole of the upper face 1a except the protecting wall 3 of the housing 1, and supporting pieces 22 extending downwardly from both left and right sides of the main portion 21. Also, a gear 23 is formed on a periphery at a forward end of each supporting piece 22.

The supporting pieces 22 are rotatably provided on both side faces 1d, 1e of the housing 1 through pivot pins 24, respectively, and are rotated around the pivot pins 24 as supporting points. Thus, the cover 2 can be shifted between a "closing position" (refer to FIGS. 1, 3, 4, 5, 6) where the upper face 1a of the housing 1 is covered by the cover 2, and an "opening position" (refer to FIGS. 2, 7) where the upper face 1a of the housing 1 is opened and the cover 2 is disposed along the back face 1c.

Also, the gears 23 of the respective supporting pieces 22 fixed to the side faces 1d, 1e are engaged with gears 27 for dampers 26 attached to the respective side faces 1d, 1e. By the dampers 26, the cover 2 is rotated gently at a constant speed. Incidentally, the dampers 26 function only when the cover 2 is rotated in an opening direction, and when the cover 2 is rotated from the "opening position" to the "closing position", the dampers 26 do not operate, so that the cover 2 can be smoothly moved to the "closing position".

In addition to the above structure, each pivot pin 24 is provided with a spring member 25, one end of which is fixed to the housing 1 and the other end of which is fixed to the supporting piece 22 of the cover 2. The cover 2 is always urged toward the "opening position" by a spring force of the spring members 25.

Further, the cover 2 is provided with an arm 21a at a position corresponding to the dent 40 of the housing 1, and the arm 21a projects linearly downwardly from the main portion 21. A catcher 6B for constituting the locking device 6 is attached to a forward end, i.e. lower end, of the arm 21a. The catcher 6B has an opening 28 facing upwardly, and when a forward end of the striker 6A is inserted into the opening 28, the forward end of the striker 6A is releasably latch-locked by a latch portion, not shown, provided in an inner portion of the catcher 6B.

In the locking device 6 formed of the catcher 6B and the striker 6A, when the cover 2 is moved to the "closing position" against the urging force of the spring members 25, the forward end of the striker 6A enters the catcher 6B through the opening 28, and the striker 6A is latch-locked with the latch portion provided in the catcher 6B (refer to FIG. 1). Also, when the cover 2 in the latch-locking state is again pushed toward the "closing position", the latch-locking state between the catcher 6B and the striker 6A is released, and the cover 2 is allowed to be rotated to the "opening position" by the urging force of the spring members 25.

Therefore, in the structure of the locking device 6, as shown in FIG. 2, when the cover 2 is situated at the "opening position", the catcher 6B is disposed in the dent 40 positioned on the back side of the projecting portion 4 of the housing 1. Therefore, even if a beverage in a container received in the housing 1 is spilled, the spilled beverage does not enter the catcher 6B through the opening 28, and also, dust does not enter the catcher 6B. Further, the latch portion can not be seen in the compartment of the vehicle. Incidentally, the locking device 6 formed of the striker 6A and the catcher 6B is well known, such as U.S. Pat. No. 5,292,158 and U.S. Pat. No. 5,090,751. Therefore, the structure of the locking device is not explained.

Figure 8:
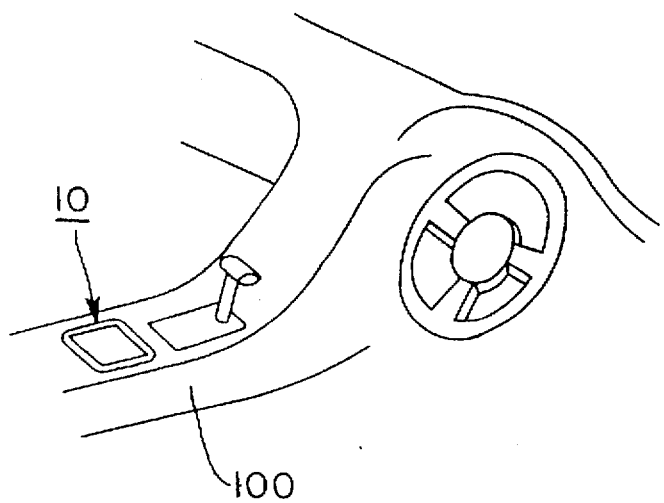
FIG. 8 is a perspective view of an essential part of an interior of the vehicle where the present invention is applied.

The container 10 for a vehicle thus constructed is installed, for example as shown in FIG. 8, in a central console 100 of the vehicle. At the time of installation, the container 10 is inserted into an attaching opening 101 (refer to FIGS. 6, 7) provided in advance to the central console 100 by dropping the container 10 from a lower side of the housing 1. When the container 10 is inserted for a predetermined length into the central console 100, the leaf springs 8 abut against an opening edge of the attaching opening 101. When the container 10 is further pushed, while the leaf springs 8 are resiliently deformed inwardly, the container 10 is allowed to be inserted until the flange portions 29 (refer to FIG. 4) extending from the upper opening face 1a of the housing 1 abut against a periphery of the attaching opening 101 and the insertion of the container 10 is prevented.

Figure 9:
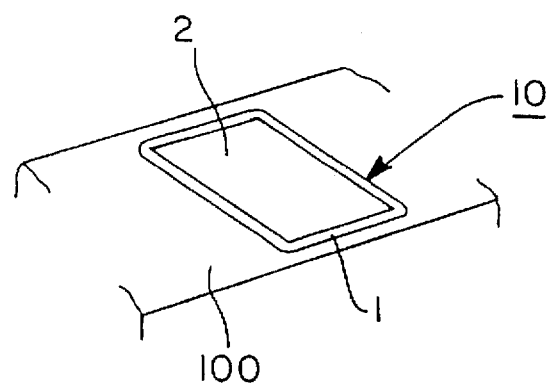
FIG. 9 is an enlarged perspective view of the essential portion of the interior of the vehicle where the present invention is applied.
Figure 10:
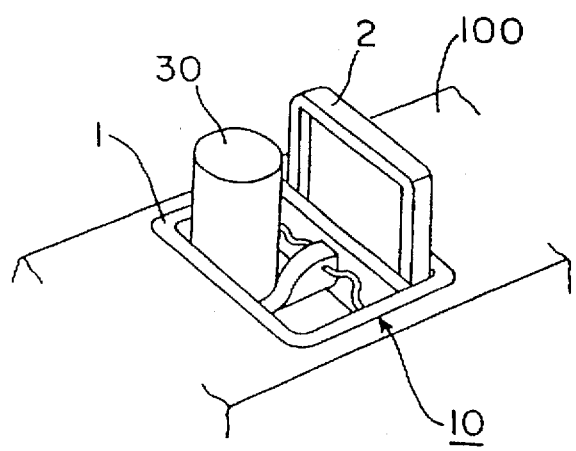
FIG. 10 is an enlarged perspective view of the essential portion of the interior of the vehicle where the present invention is applied.
Figure 11:
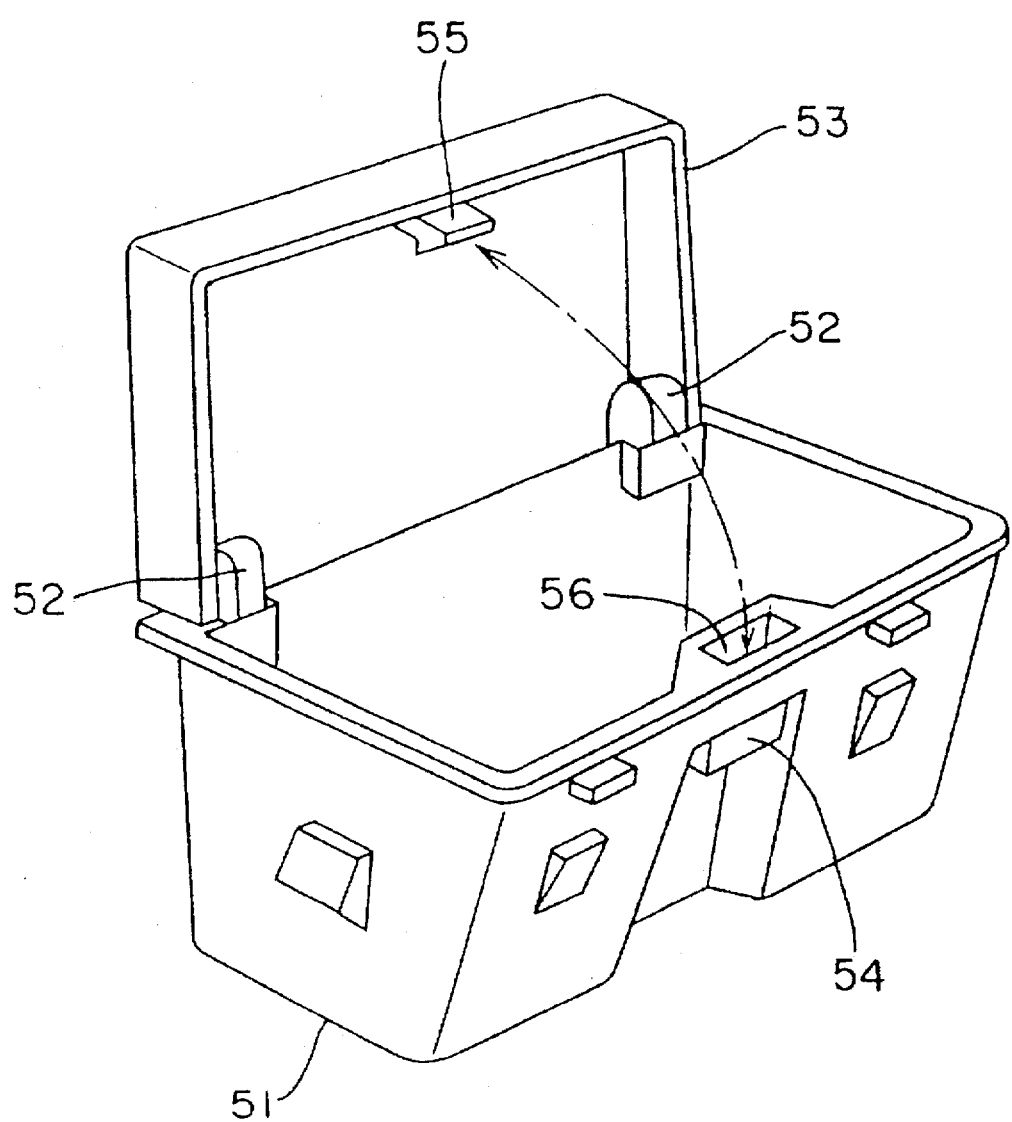
FIG. 11 is a perspective view of an example of a conventional container.

When the flange portions 29 abut against the attaching opening 101, the engaging pawls 8a of the leaf springs 8 have passed through the attaching opening 101 and resiliently restore and open in an inside of the central console 100. Thus, the engaging pawls 8a engage the inside of the central console 100 to thereby prevent the container 10 from being extracted and to complete installation thereof. FIGS. 8 to 10 show states where the container 10 for small articles of the vehicle is installed in the central console 100, respectively.

Next, an operation of the container 10 for small articles of the vehicle is described. Normally, the cover 2 is disposed in the "closing position", wherein the striker 6A is located in the catcher 6B through the opening 28, and held therein by latch-locking with a latch portion, not shown, in the catcher 6B. FIGS. 1, 3, 4 to 6, 8 and 9 show the closing state.

In case the cover 2 is opened, the cover 2 is once pushed toward the "closing position" and released. Then, the latch-locking of the catcher 6B with the striker 6A is released, and the cover 2 is moved to the "opening position" by an urging force of the spring members 25 while being slowly rotated with an action of the dampers 26. In the "opening position", the catcher 6B is located at the back side of the portion projecting 4 of the housing 1. FIGS. 2, 7, 10 show this opening state. Therefore, in this state, beverage containers or small articles can be put into or taken out of the housing 1 through the upper face 1a. Also, in case the container 10 is used as holders for cups, such as beverage containers, the holding members 5 are located to the "using positions".

In case the cover 2 is closed again, the cover 2 is rotated toward the "closing position" against the urging force of the spring members 25. Then, at the "closing position", the striker 6A is again inserted into the catcher 6B, and latch-locked therein.

As described above, according to the present invention, as the cover is opened and moved to the back side of the housing, the catcher having the latching portion for receiving the striker is moved in a direction away from the upper opening face to protect the latching portion. Therefore, even if the beverage in a container received in the housing is spilled, the spilled beverage does not enter the latching portion. Also, dust does not enter the latching portion. Accordingly, operational defects caused by the spilled beverage and dust can be eliminated to thereby improve reliability. Also, when the cover is opened, the catcher is moved to a position which can not be seen from the inside of the car to provide a good appearance at a central console area.

While the invention has been explained with reference to the specific embodiment of the invention, the explanation is illustrative, and the invention is limited only by the appended claims.

What is claimed is:

1. A container for articles comprising, a housing having a box shape and an opening at an upper face thereof, said housing including a projecting portion therein extending inwardly from an outside of the housing to form a dent at the outside thereof;

a cover movably attached to the housing, said cover moving between a closed position for closing said opening and an open position for opening said opening, said cover having an arm extending from one side of the cover toward the housing in the closed position;

a locking device including a catcher having a latching portion therein and attached to the arm of the cover, and a striker attached to the housing to engage the catcher in the closed position, said striker being located at one side of the housing near the arm and at a position communicating with said dent so that when the cover is in the open position, the arm and the catch are located in the dent, said striker projecting downwardly from the housing and being locked and engaging with said latching portion to lock said cover at said slosed position when said cover is disposed to said closed position, said striker engaged with said latching portion and being released from said latching portion when said cover in said closed position is pushed at a position away from the arm to move the cover further toward the closed position so that the cover is moved to said open position; and means for moving the cover to the open position.

2. A container according to claim 1, wherein said means for moving the cover to the open comprises a spring member situated between the cover and the housing for urging the cover toward the open position.

3. A container according to claim 2, wherein said cover has supporting portions extending downwardly from side portions thereof, each supporting portion having a hole and a gear around a periphery thereof, and said housing has pivot pins and dampers with gears at side portions thereof, each pivot pin engaging the hole and each gear of the damper engaging the gear of the supporting portion.

4. A container according to claim 3, wherein said housing has spring attaching portions at both sides thereof and leaf springs attached to the respective spring attaching portions.

5. A container according to claim 4, wherein said housing has at least two holding members therein, said holding members assuming a using position situated in the housing for holding a cup therein, and a non-using position situated in the cover when said cover is opened.

* * * * *